(12) United States Patent
Call et al.

(10) Patent No.: US 8,924,629 B1
(45) Date of Patent: Dec. 30, 2014

(54) MAPPING TABLE FOR IMPROVING WRITE OPERATION EFFICIENCY

(75) Inventors: Matthew Call, Longmont, CO (US);
Robert L. Horn, Yorba Linda, CA (US);
Mei-Man L. Syu, Fremont, CA (US);
Lan D. Phan, Garden Grove, CA (US);
John A. Morrison, Fort Collins, CO (US); Ho-Fan Kang, San Diego, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 18 days.

(21) Appl. No.: 13/155,189

(22) Filed: Jun. 7, 2011

(51) Int. Cl.
*G06F 13/00* (2006.01)

(52) U.S. Cl.
USPC ............................................... 711/103

(58) Field of Classification Search
CPC combination set(s) only.
See application file for complete search history.

(56) References Cited

U.S. PATENT DOCUMENTS

| | | | |
|---|---|---|---|
| 8,407,449 B1* | 3/2013 | Colon et al. | 711/206 |
| 2006/0062041 A1* | 3/2006 | Hiraka | 365/145 |
| 2007/0016721 A1 | 1/2007 | Gay | |
| 2007/0156998 A1* | 7/2007 | Gorobets | 711/170 |
| 2007/0276988 A1 | 11/2007 | Luo | |
| 2008/0098195 A1 | 4/2008 | Cheon et al. | |
| 2008/0209114 A1 | 8/2008 | Chow et al. | |
| 2008/0301359 A1* | 12/2008 | Smith et al. | 711/103 |
| 2009/0172247 A1* | 7/2009 | Bar-Or et al. | 711/103 |
| 2010/0332846 A1 | 12/2010 | Bowden et al. | |
| 2012/0159043 A1* | 6/2012 | Yeh | 711/103 |

\* cited by examiner

*Primary Examiner* — Charles Rones
*Assistant Examiner* — Han Doan

(57) ABSTRACT

A non-volatile storage system is disclosed which provides a mapping table which includes a granularity which does not correspond to the page size of a non-volatile storage array. A reduced mapping table granularity enables more than one mapping entry to exist in a single page on the solid-state array. A write command which does not exceed a mapping table entry can invalidate only a portion of the written page, and can be combined with a second write command to write a new page of the solid-state array.

16 Claims, 4 Drawing Sheets

Fig. 2

Mapping Table
(Entries → 8 Kb Pages)

| LCN 0 | Not Mapped / Trim |
|---|---|
| LCN 1 | PCN 3 |
| LCN 2 | PCN 5 |
| LCN 3 | Not Mapped / Trim |
| LCN 4 | PCN 1 |
| LCN 5 | Not Mapped / Trim |
| LCN 6 | Not Mapped / Trim |
| LCN 7 | PCN 4 |

201

Non-Volatile Storage Array
(8 Kb Pages)

| Page 0 | Invalid |
|---|---|
| Page 1 | LCN 4 |
| Page 2 | Invalid |
| Page 3 | LCN 1 |
| Page 4 | LCN 7 |
| Page 5 | LCN 2 |
| Page 6 | Open to Write |
| Page 7 | Open to Write |

202

Mapping Table
(Entries → 8 Kb Pages)

| LCN 0 | Not Mapped / Trim |
|---|---|
| LCN 1 | PCN 3 |
| LCN 2 | PCN 5 |
| LCN 3 | Not Mapped / Trim |
| LCN 4 | PCN 6 |
| LCN 5 | Not Mapped / Trim |
| LCN 6 | Not Mapped / Trim |
| LCN 7 | PCN 4 |

203

Non-Volatile Storage Array
(8 Kb Pages)

| Page 0 | Invalid |
|---|---|
| Page 1 | Invalid |
| Page 2 | Invalid |
| Page 3 | LCN 1 |
| Page 4 | LCN 7 |
| Page 5 | LCN 2 |
| Page 6 | LCN 4 |
| Page 7 | Open to Write |

Mapping Table
(Entries → 4 Kb Portions)

| LCN 0 | PCN 5 |
| LCN 1 | PCN 11 |
| LCN 2 | Not Mapped / Trim |
| LCN 3 | Not Mapped / Trim |
| LCN 4 | Not Mapped / Trim |
| LCN 5 | PCN 1 |
| LCN 6 | Not Mapped / Trim |
| LCN 7 | PCN 7 |
| LCN 8 | Not Mapped / Trim |
| LCN 9 | PCN 2 |
| LCN 10 | Not Mapped / Trim |
| LCN 11 | PCN 6 |
| LCN 12 | Not Mapped / Trim |
| LCN 13 | PCN 8 |
| LCN 14 | PCN 9 |
| LCN 15 | PCN 10 |

301

Non-Volatile Storage Array
(8 Kb Pages)

| Page 0 | Invalid | LCN 5 |
| Page 1 | LCN 9 | Invalid |
| Page 2 | Invalid | LCN 0 |
| Page 3 | LCN 11 | LCN 7 |
| Page 4 | LCN 13 | LCN 14 |
| Page 5 | LCN 15 | LCN 1 |
| Page 6 | Open to Write | Open to Write |
| Page 7 | Open to Write | Open to Write |

302

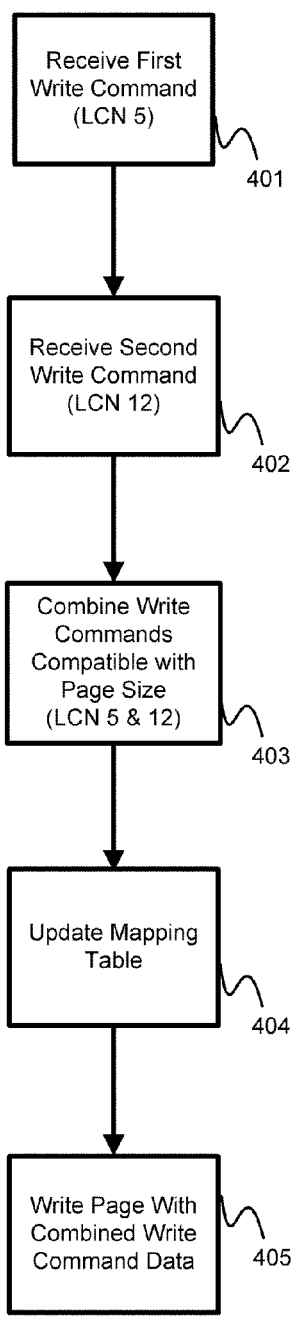

Fig. 4

Receive First Write Command (LCN 5) — 401

Receive Second Write Command (LCN 12) — 402

Combine Write Commands Compatible with Page Size (LCN 5 & 12) — 403

Update Mapping Table — 404

Write Page With Combined Write Command Data — 405

Fig. 5

Mapping Table

| | |
|---|---|
| LCN 0 | PCN 5 |
| LCN 1 | PCN 11 |
| LCN 2 | Not Mapped / Trim |
| LCN 3 | Not Mapped / Trim |
| LCN 4 | Not Mapped / Trim |
| LCN 5 | PCN 12 |
| LCN 6 | Not Mapped / Trim |
| LCN 7 | PCN 7 |
| LCN 8 | Not Mapped / Trim |
| LCN 9 | PCN 2 |
| LCN 10 | Not Mapped / Trim |
| LCN 11 | PCN 6 |
| LCN 12 | PCN 13 |
| LCN 13 | PCN 8 |
| LCN 14 | PCN 9 |
| LCN 15 | PCN 10 |

501

Non-Volatile Storage Array

| | | |
|---|---|---|
| Page 0 | Invalid | Invalid |
| Page 1 | LCN 9 | Invalid |
| Page 2 | Invalid | LCN 0 |
| Page 3 | LCN 11 | LCN 7 |
| Page 4 | LCN 13 | LCN 14 |
| Page 5 | LCN 15 | LCN 1 |
| Page 6 | LCN 5 | LCN 12 |
| Page 7 | Open to Write | Open to Write |

502

MAPPING TABLE FOR IMPROVING WRITE OPERATION EFFICIENCY

BACKGROUND

1. Technical Field

This disclosure relates to non-volatile storage subsystems, including but not limited to flash drives. More particularly, the disclosure relates to systems for reducing extraneous memory access commands when the system consistently receives write commands sized under a storage array page size.

2. Description of Related Art

Solid-state storage systems maintain a logical-to-physical mapping table for memory accesses. This mapping table associates logical addresses used by a host with corresponding physical storage locations in the non-volatile memory. Typically, the mapping table provides a mapping which corresponds to the size of a page on the non-volatile storage array. When a command is received from the host which designates a write corresponding to a portion of a page, the storage system typically reads the current data for that page, modifies the portion addressed by the host, and writes the modified page to the non-volatile storage array.

BRIEF DESCRIPTION OF THE DRAWINGS

Systems and methods which embody the various features of the invention will now be described with reference to the following drawings, in which:

FIG. 2 shows a mapping table and a storage array where an individual entry in the mapping table corresponds to a page on the storage array.

FIGS. 3 and 5 each shows an example mapping table and storage array where an individual entry in the mapping table corresponds to a portion of a page on the storage array according to an embodiment.

FIG. 4 shows a flowchart illustrating a process for processing write commands according to an embodiment.

DETAILED DESCRIPTION

Figure 1:
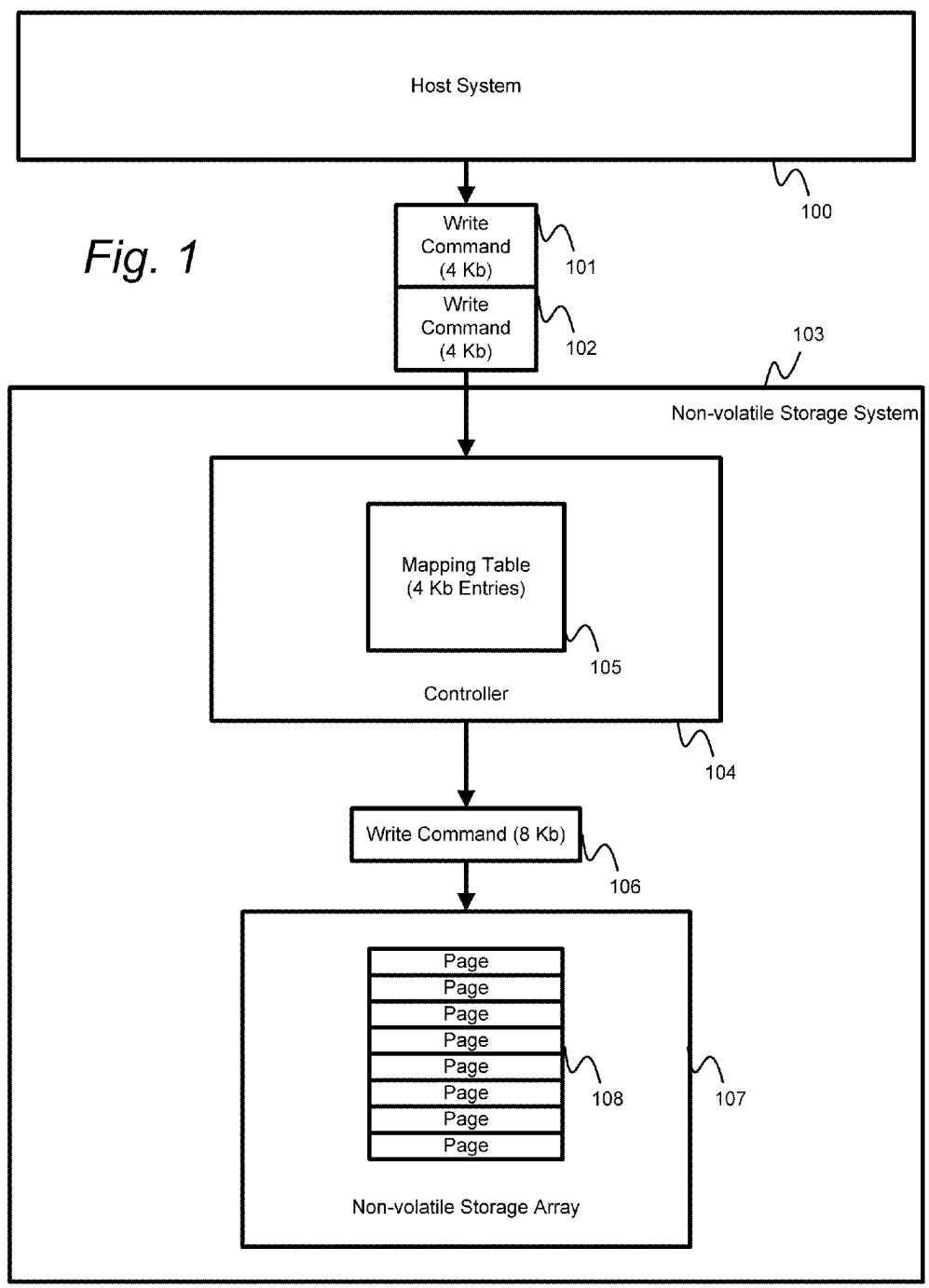
FIG. 1 shows a host system communicating to a non-volatile storage system according to an embodiment.

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

System Overview

Embodiments of the invention are directed to systems and methods for reducing write amplification due to read-modify-write processes. Write amplification refers generically to writes executed on a non-volatile storage array in excess of the writes requested by a host. For example, on average, there may be 1.5 writes on a storage system for each write requested by the host. These extra writes can be attributable to wear leveling, garbage collection, and other internal operations. When a host command designates a write command which is a smaller size than a mapping table entry size, a read-modify-write process is typically used to read the old data, modify at least a portion of that data, and write the data back to the non-volatile memory.

As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferro-electric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Referring to FIG. 1, a non-volatile storage system 103 is in communication with a host system 100 according to an embodiment. According to this embodiment, the host system issues write commands 101 and 102, which in the example shown have a size of 4 Kb. These commands can each address different logical addresses on the non-volatile storage system. The commands are received by a controller 104 which includes a mapping table 105. The mapping table 105 can provide a logical-to-physical mapping to translate logical addresses to physical storage areas on the non-volatile storage array 107. The controller 104 may comprise a processor or plurality of processors and may be partially or wholly implemented in hardware and/or software.

In this embodiment, the non-volatile storage array 107 includes a plurality of pages 108 as is well known in the art. Pages 108 correspond to the smallest writeable/programmable element on the non-volatile storage array. In this embodiment, a page size is 8 Kb. The controller 104, upon receipt of write commands 101 and 102, can designate and update the mapping table 105 with physical addresses corresponding to the physical location for the write commands. The write commands 101 and 102 can be combined into a single write command 106 issued to the non-volatile storage array 107, when it is determined that their combined size is compatible with the page size used in an embodiment. As shown here, the two commands 101 and 102 are each sized at 4 Kb and are thus combined into a single write 8 Kb write command. In an embodiment, the data size for the write command 106 corresponds to the size of a page 108. An entry in the mapping table 105 in this embodiment references a data portion in the non-volatile storage array 107 that is smaller than the page size on the non-volatile storage array 107. As such, each mapping table entry can map to a portion of a page. When a write command corresponds to the size of an entry in the mapping table, the system can update the physical address reference for the logical address of the write command and forgo a read-modify step.

In this embodiment, write commands of a 4 Kb size are shown, but other sized write commands may also be used in other embodiments. Many hosts, as well as benchmark tests, are configured to send 4 Kb writes. Currently a common page size on non-volatile solid-state drives is 8 Kb, though page size may increase as capacity increases. As a result, embodiments illustrated in this disclosure typically conform to these parameters, though other write command and page sizes are possible.

Mapping Table Matching Page Size

Referring to FIG. 2, a mapping table 201 is shown along with a representation of storage on the non-volatile storage array 202 according to an embodiment. In this embodiment, the mapping table entries correspond to the pages in the non-volatile storage array 202 (i.e., each entry references the starting location of a page). For example, in the mapping table 201, LCN 1 maps to PCN 3, which is labeled as page 3 in the non-volatile storage array 202. Mapping table 203 and non-volatile memory array 204 show the results of processing a write command at LCN 4 with a data size of 4 Kb. In this embodiment, the controller would read data from PCN 1, modify the read data with the changes in the write command, and write modified data back to the non-volatile storage array 204 in page 6 (PCN 6). The mapping table 203 is updated with the new PCN corresponding to the new written page.

Mapping Table With Reduced Reference Granularity

Referring to FIG. 3, an embodiment is shown with a mapping table with a reduced reference granularity. In this embodiment, each entry in the mapping table 301 corresponds to 4 Kb of logical addresses while the non-volatile storage array 302 implements 8 Kb page sizes. As shown in the non-volatile storage array 302, each page now corresponds to two entries in the mapping table 301, and each page now has two PCNs (e.g., Page 0 has PCN 0 and PCN 1). For example, page 4 (now addressable as PCN 8 and PCN 9) stores data corresponding to two mapping table entries: LCN 13 and LCN 14.

In this example, it is also possible for a page to store data which is treated as only partially valid. Page 0 in this example corresponds only to one logical address, LCN 5 (in the portion addressable as PCN 1). The other portion of the page (PCN 0) contains data that has been marked invalid. This may be because the data has been re-written or designated as "trim" data from the host. During garbage collection or other internal drive activities, the data corresponding to partially valid pages may be combined into a single page. As such, pages 0 and 1 in this example are each partially valid, and the data for LCN 5 and LCN 9 could be combined and re-written to another single page in memory, freeing pages 0 and 1 to be erased and written by another incoming command.

If a write command is received by the controller which corresponds to a portion referenced by a mapping table entry, it is not necessary to read the value of the entire page. Instead, the portion referenced by the PCN corresponding to the mapping table entry can be invalidated, and the new data can be written to an open page. For example, a write to LCN 7 will just invalidate PCN 7 (which is a portion of Page 3) while leaving the data in PCN 6 (the other portion of Page 3) intact. As described below, more than one write command received from the host can be combined to a write to a single page in the non-volatile storage array. Accordingly, a system with a reduced size mapping table may have a lower amount of write amplification because the portions of the page which do not correspond to the mapping table changes do not need to be re-written.

Combined Write Commands

Referring now to FIGS. 4 and 5, an example is shown of combining write commands received from a host to a write command issued to the non-volatile soild-state array. FIG. 4 shows a flowchart depicting a process according to an embodiment for combining write commands which address mapping table entries that are smaller than a page size. FIG. 5 shows the altered state of the mapping table and non-volatile storage array from FIG. 3 after processing the commands shown in FIG. 4.

Referring to FIG. 4, an example is shown for a controller in a storage device to combine two commands received from a host according to an embodiment. At block 401, the controller receives a first command directed at LCN 5. Rather than execute the command immediately, the controller may wait a brief period of time to determine if a second write command is received to determine if an entire page can be written rather than a half-page. At block 402, a second write command is received directed at LCN 12. At block 403, the first and second write command data is combined to form a single write command suitable for writing to a single page. In one embodiment, this process involves determining whether the sizes of the write commands can be combined such that the combined write data size is compatible with the page size. For example, as previously shown in FIG. 1, two 4-Kb write commands are combined into one 8-Kb write command to a storage array with 8-Kb pages. In other embodiments, the combined write data is compatible if it is smaller than or equal to the page size. At block 404, the mapping table is updated with the locations for the first and second commands (LCNs 5 & 12) to designate the portions of the target page on the non-volatile storage array where the combined write command will be written. At block 405, the combined write command is sent to the non-volatile memory for execution.

Referring to FIG. 5, the mapping table 501 and non-volatile storage array 502 are shown as updated by the process depicted in FIG. 4 (the changes indicated in bold). The combined write command is written to page 6 of the non-volatile storage array 502 (PCNs 12 and 13). A portion of the page corresponds to each LCN addressed by the first and second write commands. As shown, the mapping table 501 reflects the updated PCN mapping for LCNs 5 and 12. In addition, the old PCN for LCN 5 on page 0 (PCN 1) is now updated by the invalid page table to indicate it no longer contains valid data.

Though disclosed as primarily applicable for a mapping table with entries referencing data portions at half the size of a page, any mapping table with an entry reference granularity that is smaller than a page may be useful to reduce the amount of re-written information on the non-volatile storage drive. In addition, a mapping table entry may reference a portion of any size that is smaller than a page size, such as 8 Kb for a 32 Kb page, 4 Kb for a 12 Kb page size, and other combinations.

A mapping table with a smaller reference granularity may be beneficial even if the mapping table reference granularity does not correspond to the size of write commands received from the host. For example, if the host commands are smaller than the size of the individually addressable PCN referenced by each mapping table entry, while the read-modify-write process may still need to read the data for portions of the mapping table address not changed by the write, the commands can still be combined for a single write command. In addition, data on other portions of a page not modified by the write commands do not need to be re-written.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIG. 4 may differ from those shown in the figures. Depending on the embodiment, certain steps described in the example above may be removed, others may be added, and the sequence of steps may be altered and/or performed in parallel. Although this disclosure describes examples in which data are stored in groups of blocks termed superblocks, those skilled in the art will recognize that the various embodiments disclosed are applicable to systems with other memory measurement units such as planes, blocks, pages, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for reducing write amplification in a data storage system, the method comprising:
   maintaining a mapping table for a non-volatile solid-state storage array comprising a plurality of memory pages, the mapping table comprising a plurality of entries, each entry in the mapping table providing a one-to-one mapping between one of a plurality of logical addresses and one of a plurality of physical addresses corresponding to one of a plurality of partial memory pages of the plurality of memory pages;
   receiving a first write command from a host system, the first write command designating a first logical address of the plurality of logical addresses and first write data;
   when a size of the first write data is smaller than a memory page size of the plurality of memory pages, waiting for a period of time to receive a second write command from the host system, the second write command designating a second logical address of the plurality of logical addresses and second write data;
   when the second write command is received from the host system within the period of time and the combined size of the first write data and the second write data is smaller than or equal to the memory page size, issuing a write command to a destination memory page of the plurality of memory pages for the first and the second write commands, the destination memory page comprising a first partial memory page of the plurality of partial memory pages and a second partial memory page of the plurality of partial memory pages;
   updating entries of the mapping table to reflect writing of the first and second write data by:
   updating a first mapping entry for the first logical address with a first physical address of the plurality of physical addresses corresponding to the first partial memory page thereby invalidating data stored in a third partial memory page of the plurality of partial memory pages, and
   updating a second mapping entry for the second logical address with a second physical address of the plurality of physical addresses corresponding to the second partial memory page thereby invalidating data stored in a fourth partial memory page of the plurality of partial memory pages; and
   executing the issued write command on the storage array;
   wherein the method is performed under control of a controller of the data storage system, and
   wherein updating the entries of the mapping table is performed so that at least some memory pages of the plurality of memory pages each store partially-valid data and partially-invalid data.

2. The method for reducing write amplification of claim 1, wherein the combined size of the first write data and the second write data is equal to the memory page size.

3. The method for reducing write amplification of claim 1, wherein the first write data comprises 4 kilobytes (KB) of write data.

4. The method for reducing write amplification of claim 1, wherein the memory page size is 8 KB.

5. The method for reducing write amplification of claim 1, wherein the size of each of the first and second partial memory pages matches a logical chunk size of 4 KB.

6. The method for reducing write amplification of claim 1, wherein the size of each of the first and second partial memory pages matches a write data size used by the host system.

7. A data storage system, comprising:
   a non-volatile solid-state storage array comprising a plurality of memory pages; and
   a controller configured to:
   maintain a mapping table for the storage array, the mapping table comprising a plurality of entries, each entry in the mapping table providing a one-to-one mapping between one of a plurality of logical addresses and one of a plurality of physical addresses corresponding to one of a plurality of partial memory pages of the plurality of memory pages,
   receive a first write command from a host system, the first write command designating a first logical address of the plurality of logical addresses and first write data,
   when a size of the first write data is smaller than a memory page size of the plurality of memory pages, waiting for a period of time to receive a second write command from the host system, the second write command designating a second logical address of the plurality of logical addresses and second write data,
   when the second write command is received from the host system within the period of time and the combined size of the first write data and the second write data is smaller than or equal to the memory page size, issue a write command to a destination memory page of the plurality of memory pages for the first and the second write commands, the destination memory page comprising a first partial memory page of the plurality of partial memory pages and a second partial memory page of the plurality of partial memory pages,
   update entries of the mapping table to reflect writing of the first and second write data by:
   updating a first mapping entry for the first logical address with a first physical address of the plurality of physical addresses corresponding to the first partial memory page thereby invalidating data stored in a third partial memory page of the plurality of partial memory pages, and
   updating a second mapping entry for the second logical address with a second physical address of the plurality of physical addresses corresponding to the second partial memory page thereby invalidating data stored in a fourth partial memory page of the plurality of partial memory pages, and
   execute the issued write command on the storage array, wherein the controller is further configured to update the entries of the mapping table so that at least some memory pages of the plurality of memory pages each store partially-valid data and partially-invalid data.

8. The data storage system of claim 7, wherein the first write data comprises 4 KB of write data.

9. The data storage system of claim 7, wherein each memory page of the at least some memory pages comprises a portion storing the partially-valid data which corresponds to one logical address of the plurality of logical addresses and a portion storing the partially-invalid data which does not correspond to one logical address of the plurality of logical addresses.

10. The data storage system of claim 7, wherein the controller is further configured to perform garbage collection operations which combine partially-valid data from different memory pages of the plurality of memory pages into a single memory page of the plurality of memory pages.

11. The method for reducing write amplification of claim 1, wherein the third partial memory page stores a prior version of data corresponding to the first logical address, and the fourth partial memory page stores a prior version of data corresponding to the second logical address.

12. The data storage system of claim 7, wherein the third partial memory page stores a prior version of data corresponding to the first logical address, and the fourth partial memory page stores a prior version of data corresponding to the second logical address.

13. The method for reducing write amplification of claim 1, wherein said updating the entries of the mapping table further comprises updating the entries of the mapping table to reflect writing of the first and second write data so that another partial memory page of the same memory page of the plurality of memory pages as the third partial memory page continues to store valid data which corresponds to one logical address of the plurality of logical addresses.

14. The method for reducing write amplification of claim 1, wherein when the second write command is not received from the host system within the period of time, issuing the write command to the destination memory page for the first write command and not the second write command.

15. The data storage system of claim 7, wherein the controller is further configured to update the entries of the mapping table to reflect writing of the first and second write data so that another partial memory page of the same memory page of the plurality of memory pages as the third partial memory page continues to store valid data which corresponds to one logical address of the plurality of logical addresses.

16. The data storage system of claim 7, wherein when the second write command is not received from the host system within the period of time, the controller is further configured to issue the write command to the destination memory page for the first write command and not the second write command.

* * * * *